United States Patent
Shaik et al.

(10) Patent No.: US 8,031,679 B2
(45) Date of Patent: Oct. 4, 2011

(54) METHOD FOR PERFORMING SOFTER HANDOVER IN A BROADBAND WIRELESS COMMUNICATION SYSTEM

(75) Inventors: Basha Shaik, Suwon-si (KR); Seong-Taek Hwang, Pyeongtaek-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 712 days.

(21) Appl. No.: 12/171,377

(22) Filed: Jul. 11, 2008

(65) Prior Publication Data

US 2009/0016303 A1 Jan. 15, 2009

(30) Foreign Application Priority Data

Jul. 11, 2007 (KR) ........................ 10-2007-0069648

(51) Int. Cl.
*H04W 4/00* (2009.01)
*H04W 36/00* (2009.01)
*H04B 7/02* (2006.01)

(52) U.S. Cl. ...................... 370/334; 455/436; 455/101

(58) Field of Classification Search .......... 370/331–334, 370/339; 455/436–444, 435.1–435.2, 101, 455/561–562.1
See application file for complete search history.

(56) References Cited

U.S. PATENT DOCUMENTS

| 2006/0025158 A1* | 2/2006 | Leblanc et al. ............ 455/456.2 |
| 2008/0076432 A1* | 3/2008 | Senarath et al. ............... 455/442 |
| 2009/0040982 A1* | 2/2009 | Ho et al. ....................... 370/331 |
| 2009/0046573 A1* | 2/2009 | Damnjanovic ................ 370/216 |
| 2009/0086677 A1* | 4/2009 | Ho ................................ 370/331 |

* cited by examiner

*Primary Examiner* — Thai Hoang
(74) *Attorney, Agent, or Firm* — Cha & Reiter, LLC (57) ABSTRACT

Disclosed is a method of performing softer handover in a broadband wireless communication system. The method includes granting identification numbers to neighbor antennas around a mobile station currently performing communication, and transmitting a neighbor base station advertisement message including the identification numbers of the neighbor antennas, receiving a handover request message including an identification number of a particular antenna from the mobile station, determining if the particular antenna is located within a current coverage area of the base station, and adding the particular antenna to a diversity set and notifying information on multiple antennas included in the diversity set to the base station when the particular antenna is located within the current coverage area of the mobile station; multicasting an identical frame to the multiple antennas included in the diversity set and receiving a handover indication message from the mobile station.

22 Claims, 6 Drawing Sheets

METHOD FOR PERFORMING SOFTER HANDOVER IN A BROADBAND WIRELESS COMMUNICATION SYSTEM

CLAIM OF PRIORITY

This application claims the benefit of the earlier filing date, under 35 U.S.C. 119(a), to that patent application entitled "Method For Performing Softer Handover In A Broadband Wireless Communication System" filed in the Korean Intellectual Property Office on Jul. 11, 2007 and assigned Serial No. 2007-69648, the contents of which are hereby incorporated by reference.

BACKGROUND OF THE INVENTION

1. Field of the Invention

The present invention relates to a wireless communication system, and more particularly to a method for performing handover between base stations in order maintain the communication link with a Mobile Station (MS).

2. Description of the Related Art

Next generation communication systems are being developed in order to provide various high-speed large-capacity services to MSs. A representative example of the next generation communication systems is the Mobile WiMAX (Worldwide Interoperability for Microwave Access) communication system, an example of which is a communication system based on the Institute of Electrical and Electronics Engineers (IEEE) 802.16 standards.

In general, the WiMAX mobile communication system is based on the IEEE 802.16e Wireless Metropolitan Area Network (WMAN) standard guaranteeing the mobility of an MS, and supports Broadband Wireless Access (BWA). Handover performed in the WiMAX mobile communication system includes soft handover, softer handover, hard handover, etc. As used herein, handover refers to a process that is necessary in accordance with movement of an MS to a new traffic channel when the MS moves from one BS to a new BS or to a new antenna coverage area within the area of one BS. During the handover, it is important that the transfer of the call be successful while preventing degradation of the communication quality. It can be said that the handover is a process of efficiently recognizing change in the communication environment and newly establishing a communication path to an optimum BS. That is, the handover corresponds to a process of establishing a communication path to a neighboring BS having a better communication environment than a serving BS when an MS is located at a cell boundary area.

The softer handover particularly refers to communication transfer from a BS currently in communication with a MS to a BS expected for the same communication with the MS without forced interruption of the existing communication channel. That is, the softer handover refers to a handover required when an MS currently receiving a service moves between sectors, which are divided from a cell to which a service is provided by a predetermined BS.

Figure 1:
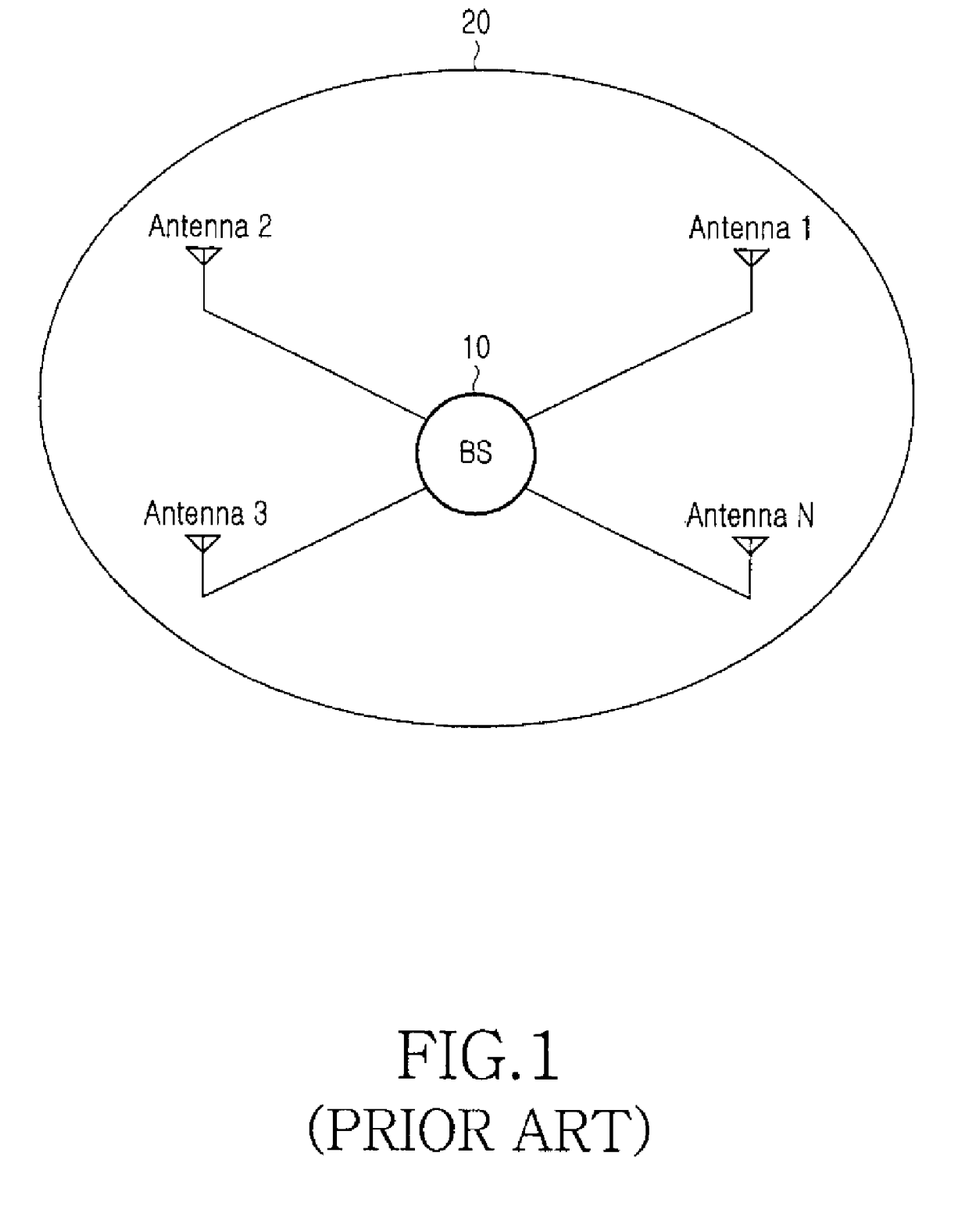
FIG. 1 illustrates a typical distributed antenna system that includes distributed antennas distributed around the same BS.

FIG. 1 illustrates a typical distributed antenna system that includes distributed antennas distributed around the same BS. In the distributed antenna system shown in FIG. 1, multiple distributed antennas 1, 2, 3, . . . , and N are distributed in a geometrically uniform arrangement around one BS 10. A MS (not shown) can communicate with the BS 10 through a distributed antenna corresponding to the area where the MS is located. Discrimination of the distributed antennas can be based on its own coverage area from a neighboring distributed antennas. The coverage areas of the distributed antennas altogether constitute an entire area, cell 20, controlled by a single BS.

Figure 2:
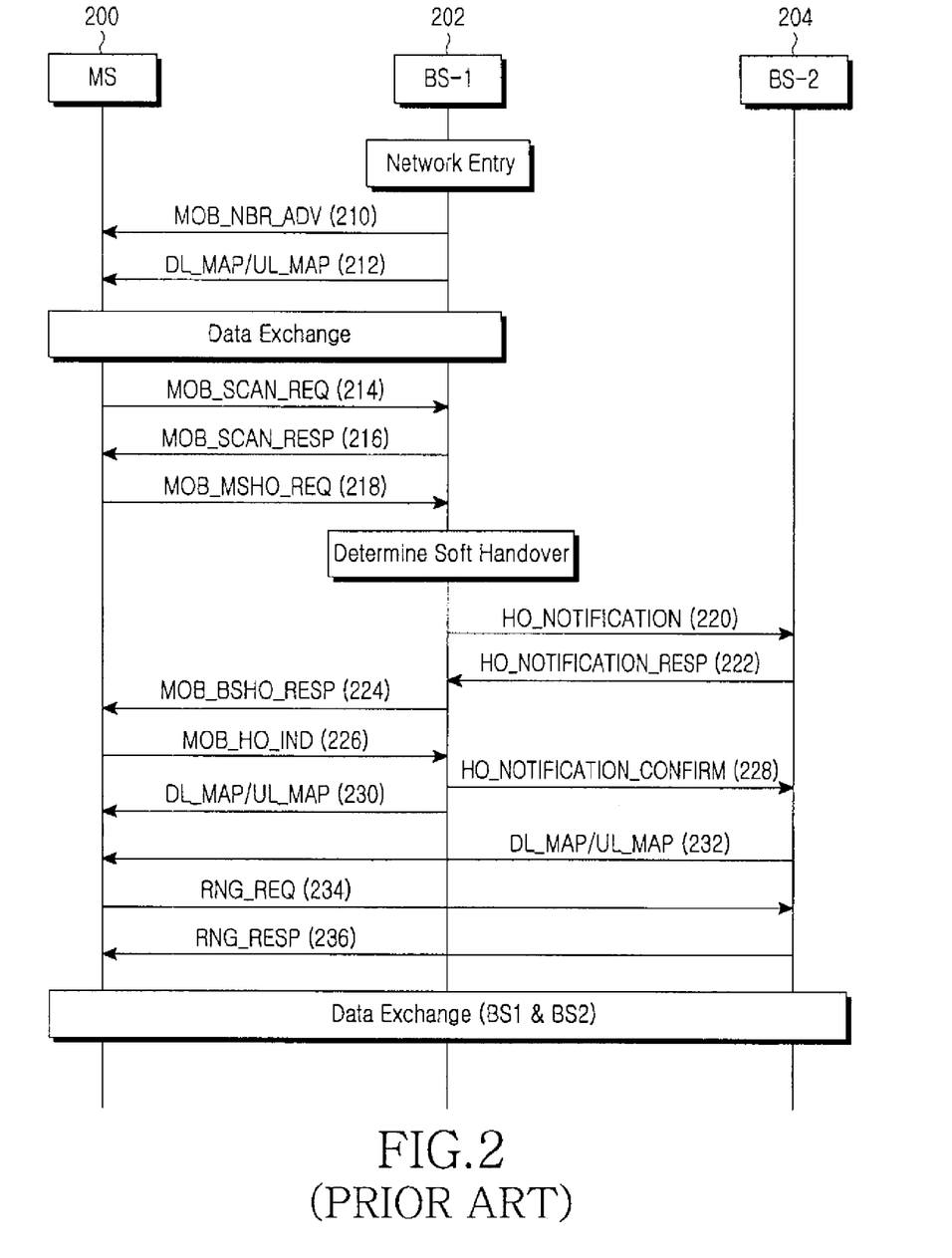
FIG. 2 is a signal flow diagram of a handover process initiated by an MS in a typical WiMAX mobile communication system.

FIG. 2 is a signal flow diagram of a handover process initiated by an MS in a typical WiMAX mobile communication system. Referring to FIG. 2, after initial network entry, a serving BS 202 transmits a Mobile Neighbor Base Station Advertisement (MOB_NBR_ADV) message to an MS 200 (step 210). The serving BS 202 transmits a DL_MAP/UL_MAP message to the corresponding MS 200 currently performing communication (step 212). While data is being exchanged, if the MS 200 determines to scan the neighbor BS 204, the MS 200 makes a request for a scanning interval by transmitting a scanning interval allocation request (MOB_SCAN-REQ) message to the BS (step 214). In response, the corresponding BS 202 transmits a scanning interval allocation response (MOB_SCAN-RESP) message including a scanning interval and scanning object information to the MS 200 (step 216). Then, the MS 200 scans the neighbor BS 204 within the scanning interval received from the serving BS 202 and measures signal intensities of the neighbor BS 204. When the signal intensity of the neighbor BS 204 is larger than that of the serving BS 202, the MS 200 reports this information by transmitting a mobile station handover request (MOB_M-SHO-REQ) message to the serving BS 202 (step 218). The serving BS 202 accepts the handover determination (high speed BS switching/macro diversity handover), and requests resources by transmitting a handover notification (HO_NOTIFICATION) message to a target BS (step 220). In response, the target BS 202 transmits a handover notification response (HO_NOTIFICATION-RESP) message (step 222). Then, the serving BS 202 transmits a BS handover response (MOB_B-SHO-RESP) message including information on the target BS 204 to the MS 200 (step 224), and the MS transmits a handover indication (MOB_HO-IND) message identifying completion of the handover to the serving BS 202 (step 226). The serving BS 202 transmits a handover notification confirmation (HO_NOTIFICATION-CONFIRM) message to the target BS 204 (step 228), and then transmits a DL_MAP/UL_MAP message to the MS 200 and the target BS 204 (steps 230 and 232). Thereafter, the MS 200 transmits an RNG_REQ message to the target BS 204 (step 234), exchanges an RNG_REQ/RESP message with the target BS 204, establishes a normal operation state, and then completes the handover process. Thereafter, the MS 200 prepares a process for the target BS 204. Specifically, the MS 200 exchanges data with the two BSs in the case of macro diversity handover.

Figure 3:
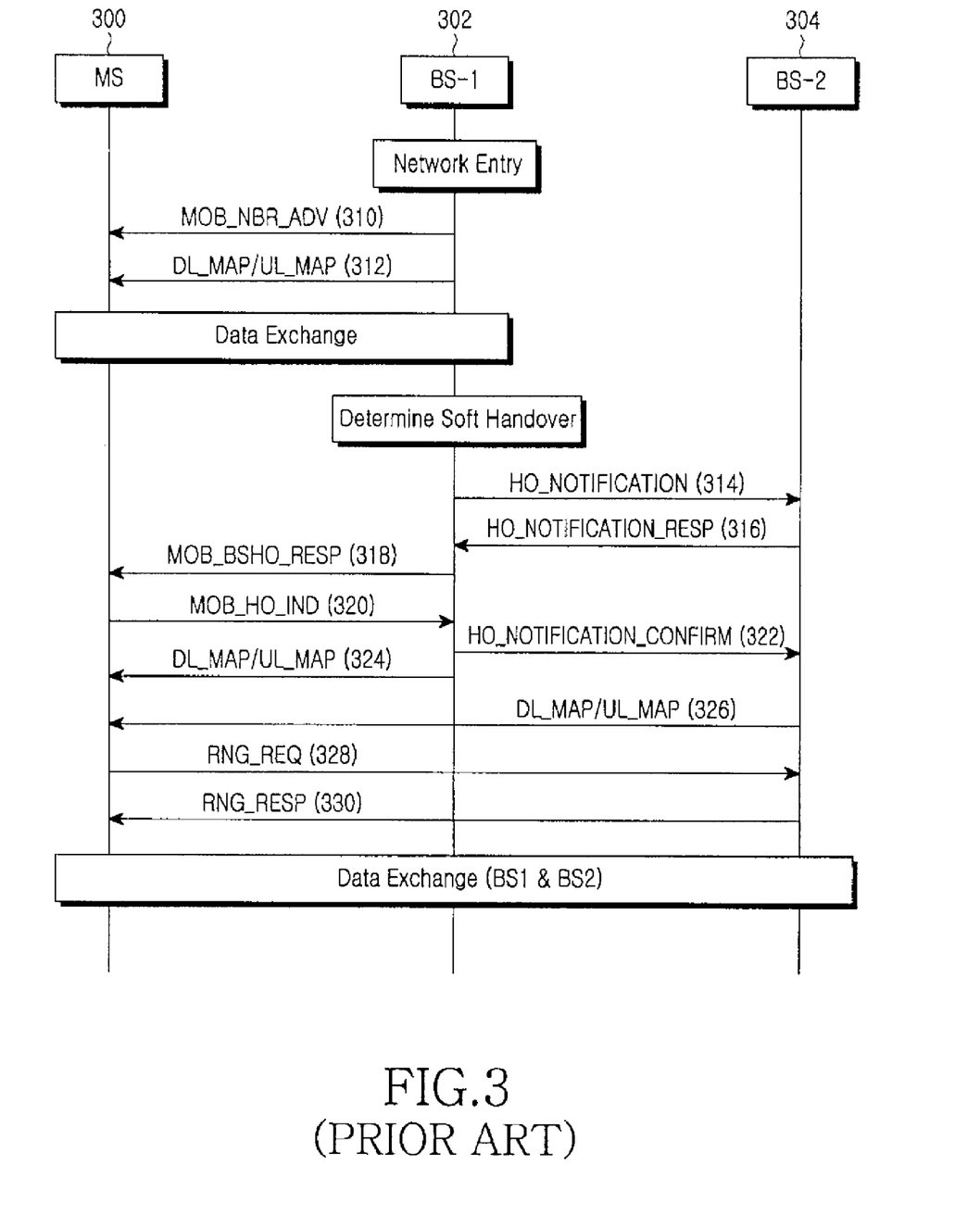
FIG. 3 is a signal flow diagram of a handover process initiated by a BS in a typical WiMAX mobile communication system.

FIG. 3 is a signal flow diagram of a handover process initiated by a BS in a typical WiMAX mobile communication system. Referring to FIG. 3, after initial network entry, a serving BS 302 transmits a Mobile Neighbor Base Station Advertisement (MOB_NBR_ADV) message to an MS 300 (step 310). The serving BS 302 transmits a DL_MAP/UL_MAP message to the corresponding MS 300 currently performing communication (step 312), exchanges data with the MS 300, and then determines to perform handover. The serving BS 302 transmits a handover notification (HO_NOTIFICATION) message to a target BS 304 (step 314). Further, the serving BS 302 transmits a DL_MAP/UL_MAP message to the MS 300 and the target BS 304 (steps 324 and 326). Thereafter, the MS 300 transmits an RNG_REQ message to the target BS 304 (step 328), exchanges an RNG_REQ/RESP message with the target BS 304, establishes a normal operation state, and then completes the handover process.

The conventional handover process as described above takes only the handover between BSs into consideration without reflecting handover in a distributed antenna system including a plurality of divided sectors within the same cell. In this regard, the BSs must synchronize with each other in relation to time and frame structure. However, such synchronization is a very difficult job, and a problem of overhead may occur while the BSs participating the handover share or transmit the MAC.

SUMMARY OF THE INVENTION

The present invention provides a method for communication through a rapid softer handover operation without a complicated process between areas of distributed antennas distributed around the same base station.

In accordance with an aspect of the present invention, there is provided a method of performing softer handover in a broadband wireless communication system, the method including the steps of granting identification numbers to neighbor antennas around a mobile station currently performing communication, and transmitting a neighbor base station advertisement message including the identification numbers of the neighbor antennas, receiving a handover request message including an identification number of a particular antenna from the mobile station, determining if the particular antenna is located within a current coverage area of the base station, and adding the particular antenna to a diversity set and notifying information on multiple antennas included in the diversity set to the base station when the particular antenna is located within the current coverage area of the mobile station, multicasting an identical frame to the multiple antennas included in the diversity set and receiving a handover indication message from the mobile station.

In accordance with another aspect of the present invention, there is provided a method of performing softer handover by a mobile station in a broadband wireless communication system, the method including the steps of receiving neighbor base station information including identification numbers of neighbor antennas from a serving base station currently performing communication, measuring and scanning intensities of incoming signals from the neighbor antennas, determining a location of a neighbor antenna when a result of the scanning shows that an incoming signal from the neighbor antenna has an intensity larger than that of an incoming signal from a current antenna being in communication, when the location of the neighbor antenna belongs to an area of the same serving base station, transmitting an identification number of the neighbor antenna to the serving base station, receiving identical frames from at least one antenna and combining the received frames and transmitting a handover indication message to the serving base station.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Exemplary embodiments of the present invention will be described with reference to the accompanying drawings. In the following description, various specific definitions found are provided only to help general understanding of the present invention, and it is apparent to those skilled in the art that the present invention can be implemented without such definitions.

As used herein, the terms "handover" and "handoff" have the same meaning. That is, the term "handover" or "handoff" refers to a process according to a movement of an MS to a new traffic channel when the MS interrupts connection to a currently-connected BS (serving BS) or a currently-connected antenna (serving antenna) and then connects with one of a neighboring BS or an antenna thereof.

Figure 4:
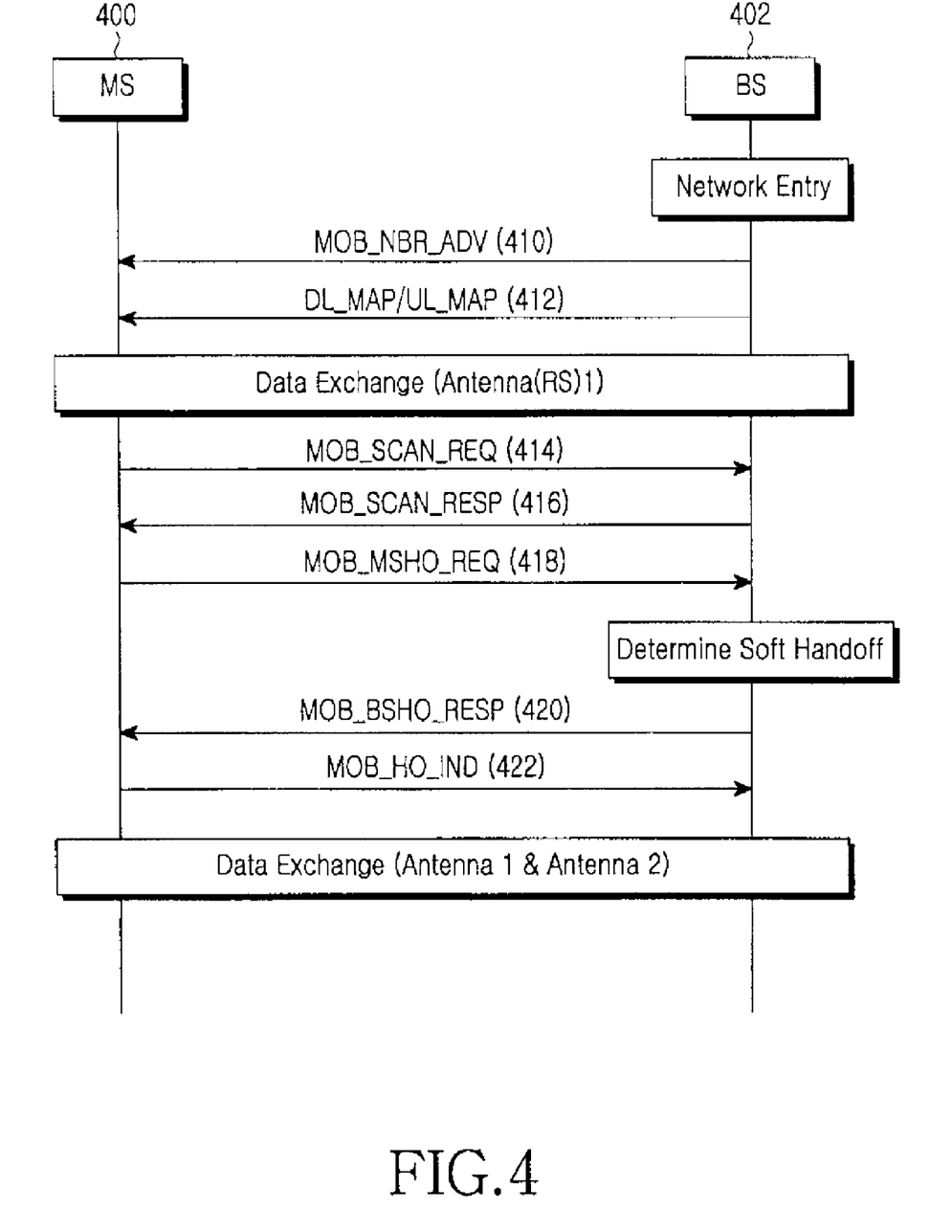
FIG. 4 is a signal flow diagram of a handover process initiated by an MS in a broadband wireless communication system according to an embodiment of the present invention.

FIG. 4 is a signal flow diagram of a handover process initiated by an MS 400 in a broadband wireless communication system according to an embodiment of the present invention. Referring to FIG. 4, after initial network entry, a serving BS 402 transmits a Mobile Neighbor Base Station Advertisement (MOB_NBR_ADV) message to an MS 400 (step 410). The MOB_NBR_ADV message includes identification numbers of neighbor antennas around the MS 400 currently performing communication. This can be achieved by changing the MOB_NBR_ADV message, which is defined in the standards for the IEEE 802.16e-based WiMAX system to which the present application is applied, in the following manner.

```
MOB_NBR-ADV_Message_format( ) {
------ N_NEIGHBORS
For(j=0; j<N_NEIGHBORS; j++)  {
                                BSID
                                Antenna Number
                        }     -----    }
```

After step 410, the serving BS 402 transmits a DL_MAP/UL_MAP message to the corresponding MS 400 currently performing communication (step 412). At this time, the serving BS 402 generates the MOB_NBR_ADV message and transmits the MOB_NBR_ADV message to the MS 400 continuously according to a preset period.

After the MS 400 exchanges data with the serving BS 402 and receives the MOB_NBR_ADV message including information on a neighbor antenna allocated an identification number by the serving BS 402 through steps 410 and 412, the MS 400 transmits a mobile station scanning interval allocation request (MOB_SCN_REQ) message to the serving BS 402 in order to measure qualities of signals from multiple antennas, i.e. in order to scan the signal intensities (step 414). The MOB_SCN_REQ message and messages described below have the same structures as those of the messages generally defined for the broadband wireless communication systems, so detailed description thereof is omitted here.

Since the MS 400 can receive signals from multiple BSs, information on multiple BSs can be included in the MOB_SCN_REQ message or MOB_SCN_RESP message, which is described later.

Further, upon receiving the MOB_SCN_REQ message, the serving BS 402 approves the request, and transmits a mobile station scanning interval allocation response (MOB_SCAN_RESP) message including scanning information, which includes scanning continuation time, a starting point of the scanning, and information to be scanned, to the MS 400 (step 416). At this time, the MS 400 performs the scanning according to intensities of reception signals from neighbor antennas around its own position. Further, in a distributed antenna system according to the present invention, which has a relatively wide coverage area, handover between antennas belonging to the same BS is more frequent than handover between neighboring BSs. That is, a probability that an antenna belonging to the same BS becomes the target antenna is higher than a probability that an antenna belonging to a neighbor BS becomes the target antenna. Therefore, scanning of antennas belonging to the same BS is performed over the scanning of antennas belonging to a neighboring BS.

As described above, the serving BS 402 constructs the MOB_NBR_ADV message by collecting information on neighboring BSs within a corresponding cell area, and periodically transmits the constructed MOB_NBR_ADV message to the MS 400. Then, the corresponding MS 400 having received the MOB_NBR_ADV message periodically transmitted from the serving BS 402 identifies identification numbers of the neighbor antennas included in a particular field of the MOB_NBR_ADV message, measures intensities of incoming signals from the neighbor BS antennas provided with the identification numbers, and performs scanning according to the intensities of the incoming signals. Then, when a signal from a new antenna has an intensity larger than that of the antenna currently performing communication, is detected, the MS 400 checks if the antenna transmitting the signal having the larger intensity is an antenna located within the same BS. When the newly detected antenna is located within the same BS, the MS 400 determines to change the connection from the current antenna to the newly detected neighbor antenna. Then, the MS 400 transmits a mobile station handover request (MOB_MSHO_REQ) message to the serving BS 402 (step 418). The MOB_MSHO_REQ message contains an identification number of the neighbor antenna to which handover is expected. Further, in response to the MOB_MSHO_REQ message, the serving BS 402 transmits a mobile station handover response (MOB_BSHO_RESP) message to the MS 400 (step 420). At this time, the serving BS 402 adds an identification number of the antenna, to which the MS 400 is expected to handover. That is, the identification number of the antenna included in the MOB_MSHO_REQ message, is added to the diversity set. As used herein, the diversity set refers to a set of at least one antenna, with which a predetermined MS can communicate with the strongest reception intensity in the same frequency, except for an antenna currently communicating with the predetermined MS. Simultaneously while the serving BS 402 transmits a MOB_BSHO_RESP message to the MS 400, the serving BS 402 multicasts the frame, which is being transmitted to the MS 400, to the multiple antennas included in the diversity set. The number of the antennas included in the diversity set is a number, which is changeable according to a location of a corresponding MS and allows the corresponding MS to communicate with a desired signal quality.

Meanwhile, the frame being transmitted to the MS 400 can be divided into sub-frames, each of which can be transmitted to one antenna, that is, specific multicast may be performed.

Further, the MS 400 receives and combines frames from the multiple antennas included in the diversity set, and transmits the mobile station handover indication (MOB_HO_IND) message to the serving BS 402 (step 422). Then, the MS 400 completes the handover process.

Figure 5:
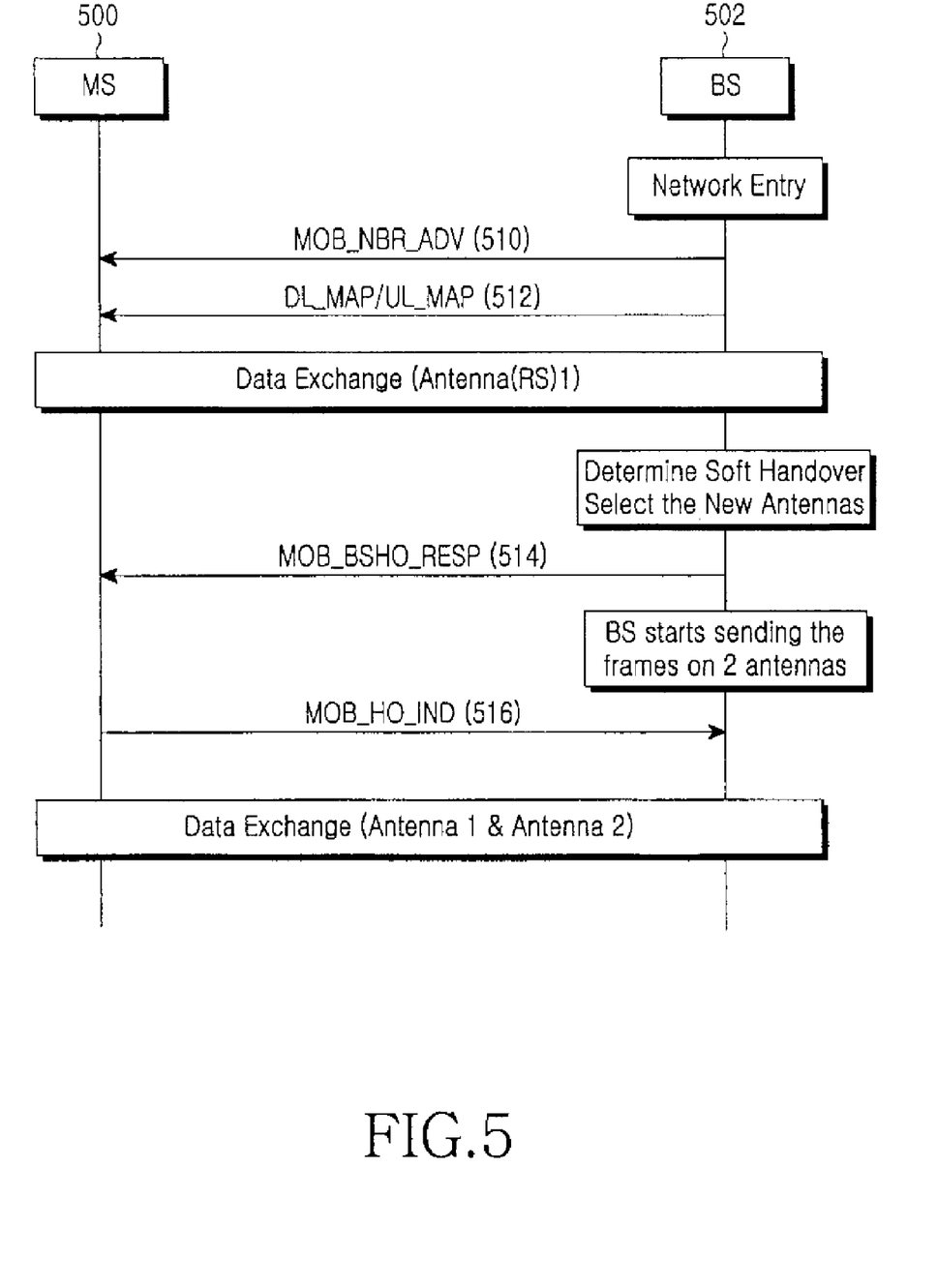
FIG. 5 is a signal flow diagram of a handover process initiated by a BS in a broadband wireless communication system according to an embodiment of the present invention.

FIG. 5 is a signal flow diagram of a handover process initiated by a BS 502 in a broadband wireless communication system according to an embodiment of the present invention. Referring to FIG. 5, after initial network entry, a serving BS 502 transmits a Mobile Neighbor Base Station Advertisement (MOB_NBR_ADV) message to an MS 500 (step 510). The MOB_NBR_ADV message includes identification numbers of neighboring antennas around the MS 500 currently performing communication. This can be achieved by changing the MOB_NBR_ADV message, which is defined in the standards for the IEEE 802.16e-based WiMAX system to which the present application is applied, in the following manner.

```
MOB_NBR-ADV_Message_format( ) {
------ N_NEIGHBORS
For(j=0; j<N_NEIGHBORS; j++)   {
                                BSID
                                Antenna Number
                             }  -----   }
```

After step 510, the serving BS 502 transmits a DL_MAP/UL_MAP message to the corresponding MS 500 currently performing communication (step 512) with BS 502. At this time, the serving BS 502 generates the MOB_NBR_ADV message and transmits the MOB_NBR_ADV message to the MS 500 continuously according to a preset period.

As described above, the serving BS 502 constructs the MOB_NBR_ADV message by collecting information on neighbor BSs within a corresponding cell area, and periodically transmits the constructed MOB_NBR_ADV message to the MS 500. Then, the corresponding MS 500 having received the MOB_NBR_ADV message, periodically transmitted from the serving BS 502, identifies identification numbers of the neighbor antennas included in a particular field of the MOB_NBR_ADV message, measures intensities of incoming signals to the MS 500, and determines handover to a new antenna capable of communicating with the MS 500 with a desired signal quality. Further, in response to the MOB_MSHO_REQ message, the serving BS 502 transmits a mobile station handover response (MOB_BSHO_RESP) message to the MS 500 (step 514).

At this time, the serving BS 502 adds an identification number of the antenna, to which the MS 500 is expected to handover, i.e., the identification number of the antenna included in the MOB_MSHO_REQ message, to the diversity set. As used herein, the diversity set refers to a set of at least one antenna, with which a predetermined MS can communicate with the strongest reception intensity in the same frequency, except for the antenna currently communicating with the predetermined MS. Simultaneously while the serving BS 502 transmits the MOB_BSHO_RESP message to the MS 500, the serving BS 502 multicasts the frame, which is being transmitted to the MS 500, to the multiple antennas included in the diversity set. The number of the antennas included in the diversity set is a number, which is changeable according to a location of a corresponding MS and allows the corresponding MS to communicate with an optimum signal quality.

Meanwhile, the frame being transmitted to the MS 500 can be divided into sub-frames, each of which can be transmitted to one antenna, that is, specific multicast may be performed.

Further, the MS 500 receives and combines frames from the multiple antennas included in the diversity set, and transmits the mobile station handover indication (MOB_HO_IND) message to the serving BS 502 (step 516). Then, the MS 500 completes the handover process.

Figure 6:
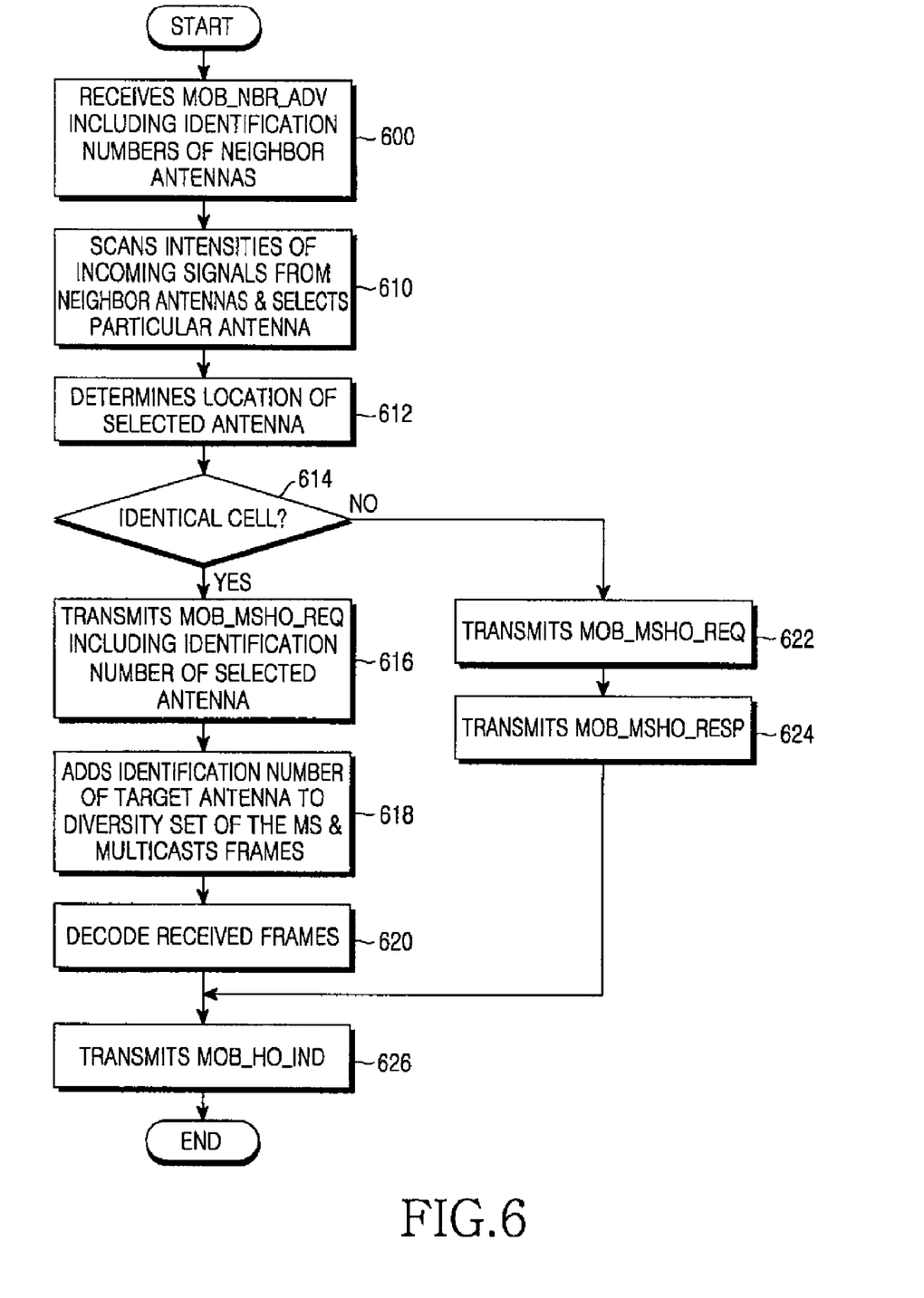
FIG. 6 is a flow diagram illustrating a method of handover in a broadband wireless communication system according to an embodiment of the present invention.

FIG. 6 is a flow diagram illustrating a method of handover in a broadband wireless communication system according to an embodiment of the present invention. Referring to FIG. 6, first, a predetermined MS receives a MOB_NBR_ADV message including identification numbers of neighbor antennas around the MS (step 600). Then, the corresponding MS measures and scans intensities of incoming signals from neighbor antennas around the MS, and selects a particular antenna capable of achieving a desired communication quality (step 610). Then, the MS determines the location of the selected antenna, i.e. a target antenna, to which handover is expected (steps 612 and 614). When the antenna is located within the same BS area, the MS transmits the MOB_MSHO_REQ message including an identification number of the selected antenna to the serving BS (step 616). Upon receiving the MOB_MSHO_REQ message from the MS, the serving BS adds the identification number of the target antenna to the diversity set of the MS, and multicasts the same frames through multiple antennas included in the diversity set (step 618). Upon receiving the frames from the multiple antennas, the MS combines and decodes them (step 620). Then, the MS transmits a MOB_HO_IND message, which is a handover indication message, to the serving BS (step 626), and then performs handover to the target antenna.

Meanwhile, as a result of the determination in step 614, when the target antenna expected for handover thereto is not located in the same BS but is located in another BS, MOB_MSHO_REQ, MOB_BSHO_RESP, and MOB_HO_IND messages, which are typically defined for handover in a broadband wireless access communication system, are transmitted/received between the MS and the serving BS for execution of handover (steps 622 to 624).

As described above, when an MS moves within a WiMAX network based on a distributed antenna system according to the present invention, additional time and frame synchronization is not required and exchange of information with another BS is unnecessary. Therefore, the present invention enables rapid handover.

While above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of performing softer handover in a broadband wireless communication system in including at least one base station (BS) and at least one mobile station (MS), the method comprising the steps of:
   granting identification numbers to neighboring antennas associated with said at least one base station currently performing communication, and transmitting to a neighbor base station advertisement message including the identification numbers of the neighboring antennas;
   receiving a handover request message including an identification number of a particular antenna from at least one mobile station operating in said wireless communication system;
   determining if the particular antenna is located within a current coverage area of the base station, and adding the particular antenna to a diversity set and providing notification information on multiple antennas included in the diversity set to the mobile station when the particular antenna is located within the current coverage area of the base station;
   multicasting an identical frame to the multiple antennas included in the diversity set; and
   receiving a handover indication message from the mobile station.

2. The method of claim 1, further comprising the step of, when the particular antenna is not located within a current coverage area of the base station, providing notification information on another one of said at least one base stations having a coverage area in which the particular antenna is located, to the mobile station.

3. The method of claim 1, wherein the diversity set comprises a set of at least one antenna which can communicate with a strongest reception intensity in an identical frequency excepting for an antenna currently communicating with the predetermined mobile station.

4. The method of claim 1, further comprising:
   providing a neighbor base station advertisement message to another one of said at least one base stations, wherein the neighbor base station advertisement message is a Mobile Neighbor Base-station Advertisement (MOB_NBR_ADV) message.

5. The method of claim 4, wherein the MOB_NBR_ADV message comprises a field containing information on neighbor antennas including at least identification numbers of said antennas.

6. The method of claim 1, wherein the information on the multiple antennas included in the diversity set comprises identification numbers granted to the antennas included in a base station.

7. The method of claim 1, wherein a number of the antennas included in the diversity set is a number, which is changeable according to a location of a corresponding mobile station and allows the corresponding mobile station to communicate in a desired signal quality.

8. A method of performing softer handover by a mobile station in a broadband wireless communication system, the method comprising the steps of:
   receiving neighbor base station information including identification numbers of neighbor antennas from a serving base station currently performing communication;
   measuring and scanning intensities of incoming signals from the neighbor antennas associated with the neighbor base station;

determining a location of a neighbor antenna when a result of the scanning shows that an incoming signal from the neighbor antenna has an intensity larger than that of an incoming signal from an antenna from a current serving base station in communication with said mobile station;

when the location of the neighbor antenna belongs to an area of the same serving base station, transmitting an identification number of the neighbor antenna to the serving base station;

receiving identical frames from at least one antenna and combining the received frames; and transmitting a handover indication message to the serving base station.

9. The method of claim 8, further comprising the step of:
transmitting information on a base station to which the neighbor antenna belongs when the location of the neighbor antenna does not belong to the area of the same serving base station.

10. The method of claim 8, wherein the scanning is performed among multiple antennas belonging to the same serving base station.

11. The method of claim 1, wherein each of the antennas is a distributed antenna capable of simultaneously communicating with at least one mobile station.

12. An apparatus for performing softer handover in a broadband wireless communication system, the apparatus comprising:
a processor in communication with a memory, the memory including code, which when accessed by the processor provides instruction to the processor to execute:
granting identification numbers to neighboring antennas associated with said at least one base station currently performing communication, and transmitting to a neighbor base station advertisement message including the identification numbers of the neighboring antennas;
receiving a handover request message including an identification number of a particular antenna from at least one mobile station operating in said wireless communication system;
determining if the particular antenna is located within a current coverage area of the base station, and adding the particular antenna to a diversity set and providing notification information on multiple antennas included in the diversity set to the mobile station when the particular antenna is located within the current coverage area of the base station;
multicasting an identical frame to the multiple antennas included in the diversity set; and
receiving a handover indication message from the mobile station.

13. The apparatus of claim 12, wherein said processor accessing code for further executing:
determining whether said particular antenna is associated with a current base station in communication with said mobile station; and
when the particular antenna is not located within a current coverage area of the base station, providing notification information on another one of said at least one base stations having a coverage area in which the particular antenna is located, to the mobile station.

14. The apparatus of claim 12, wherein the diversity set comprises a set of at least one antenna which can communicate with a strongest reception intensity in an identical frequency excepting for an antenna currently communicating with the predetermined mobile station.

15. The apparatus of claim 12, wherein said processor accessing code for further executing:
providing a neighbor base station advertisement message to another one of said at least one base stations, wherein the neighbor base station advertisement message is a Mobile Neighbor Base-station Advertisement (MOB_NBR_ADV) message.

16. The apparatus of claim 15, wherein the MOB_NBR_ADV message comprises a field containing information on neighbor antennas including at least identification numbers of said antennas.

17. The apparatus of claim 12, wherein the information on the multiple antennas included in the diversity set comprises identification numbers granted to the antennas included in a base station.

18. The apparatus of claim 12, wherein a number of the antennas included in the diversity set is a number, which is changeable according to a location of a corresponding mobile station and allows the corresponding mobile station to communicate in a desired signal quality.

19. The apparatus of claim 12, wherein said processor access code for further executing:
measuring and scanning intensities of incoming signals from neighbor antennas associated with a neighbor base station.

20. The apparatus of claim 19, wherein said processor further access code for executing:
transmitting information on a base station to which the neighbor antenna belongs when the location of the neighbor antenna does not belong to the area of the serving base station.

21. The apparatus of claim 19, wherein the scanning is performed among antennas belonging to the serving base station more often than those of a neighboring base station.

22. The apparatus of claim 12, wherein each of the antennas is a distributed antenna capable of simultaneously communicating with at least one mobile station.

* * * * *